United States Patent [19]

Schuppiser et al.

[11] 4,440,896

[45] Apr. 3, 1984

[54] PROCESS FOR THE PREPARATION OF LATICES OF VINYL ACETATE POLYMERS

[75] Inventors: Jean-Luc Schuppiser, Claye Souilly; Jean-Claude Daniel, Fontenay-Sous-Bois, both of France

[73] Assignee: Rhone-Poulenc Specialties Chimiques, France

[21] Appl. No.: 405,412

[22] Filed: Aug. 5, 1982

[30] Foreign Application Priority Data

Aug. 10, 1981 [FR] France ................ 81 15436

[51] Int. Cl.$^3$ .................................................. C08F 2/16
[52] U.S. Cl. .................................. 524/458; 524/186; 524/377
[58] Field of Search ............... 524/186, 377, 458, 832, 524/833; 526/201, 209

[56] References Cited

U.S. PATENT DOCUMENTS 2,998,400 8/1961 French ........................ 526/203

FOREIGN PATENT DOCUMENTS 1139202 1/1969 United Kingdom .

Primary Examiner—Joseph L. Schofer
Assistant Examiner—Judy M. Reddick
Attorney, Agent, or Firm—Finnegan, Henderson, Farabow, Garrett & Dunner

[57] ABSTRACT

Process for the preparation of latices of vinyl acetate polymers. Vinyl acetate is polymerized by itself or mixed with at least one copolymerizable monomer, in aqueous emulsion, in the presence of an initiator, an emulsifier and a protective colloid comprising a water-soluble polymer (a) containing at least one monomer of acrylamide, methacrylamide, or substituted or unsubstituted N-alkyl derivatives of acrylamide or methacrylamide and a water-soluble polymer (b) of ethylene glycol, the polymer (b) having a molecular weight between 1,000 and 50,000. The latices may be applied as binders in the manufacture of paints, glues, paper, textiles, floor coverings and mortar additives.

11 Claims, No Drawings

PROCESS FOR THE PREPARATION OF LATICES OF VINYL ACETATE POLYMERS

The invention relates to a process for preparing latices of vinyl acetate polymers and also to the polymer latices obtained by the process.

Latices of vinyl acetate polymers are generally used as binders in the manufacture of glues, paints, textiles, paper and the like. Such latices are prepared by the polymerization of vinyl acetate, by itself or mixed with a copolymerizable monomer, in emulsion, in the presence of protective colloids such as cellulose ethers, polyvinyl alcohols or polyvinylpyrrolidone. These protective colloids give the latices good stability during both storage and handling, together with the viscosity required for the applications. Disadvantageously, however, polymer films derived from these latices are sensitive to water.

Furthermore, it has been proposed to polymerize vinyl esters in emulsion, in the presence of copolymers of acrylamide, alkylacrylamide and, if appropriate, acrylic acid as colloids. However, during polymerization, coagulation may occur and, furthermore, the latices obtained do not possess all the properties essential in the various applications of the latices.

In contrast, by the process of the present invention one obtains latices of vinyl acetate polymers which possess suitable viscosity for applications and good stability for both storage and handling and also give polymer films having a very good resistance to water.

The process of the present invention comprises the step of polymerizing vinyl acetate, by itself or mixed with at least one copolymerizable monomer, in aqueous emulsion, in the presence of an initiator, an emulsifier and a protective colloid. The protective colloid comprises a water-soluble polymer (a) containing at least one monomer selected from the group consisting of acrylamide, methacrylamide, substituted or unsubstituted N-alkyl derivatives of acrylamide and substituted or unsubstituted N-alkyl derivatives of methacrylamide, and a water-soluble polymer (b) of ethylene glycol, wherein the polymer (b) has a molecular weight between 1,000 and 50,000.

The water-soluble amide polymer (a), which is the first constituent of the protective colloid, is preferably a homopolymer, or a copolymer in all proportions, or a mixture of at least one homopolymer and/or at least one copolymer of the monomers acrylamide, methacrylamide and N-alkyl derivatives of acrylamide or methacrylamide in which the alkyl group possesses 1 to 4 carbon atoms and can be substituted by amine or hydroxyl groups or alkoxy groups possessing 1 to 4 carbon atoms. Examples of preferred amide monomers include acrylamide, methacrylamide, N-methylacrylamide, N,N-dimethylacrylamide, N-isopropylacrylamide, N-methylaminoisopropylacrylamide, N-methylolacrylamide, N-methylolmethacrylamide, N-methoxymethylacrylamide and N-isobutoxymethylacrylamide.

The water-soluble amide polymer (a) may be prepared, for example, by the polymerization of at least one of the above mentioned amide monomers at a concentration of 0.1 to 7% by weight, in aqueous solution, in the presence of a water-soluble free-radical initiator and/or ultraviolet radiation, at a temperature between 0° and 90° C.

A suitable initiator for this polymerization may be selected from conventional water-soluble free-radical initiators for polymerization in soluble, such as hydrogen peroxide, alkali metal persulfates, water-soluble diazo derivatives, or redox systems based on oxidizing agents, such as hydrogen peroxide, organic peroxides or hydroperoxides, and reducing agents, such as alkali metal sulfites and bisulfites, amines, hydrazine, metal formaldehydesulfoxylates and the like. All these initiators are used by themselves or in a mixture, in amounts of 0.1 to 10% by weight of the amide monomer(s).

The water-soluble amide polymer (a) may be crosslinked by up to 50% by weight of the amide monomer(s) of water-soluble crosslinking agents represented by N,N'-$C_1$-$C_4$-alkylidene-bis-($C_3$-$C_5$-unsaturated acid amides), such as N,N'-methylene-bis-(acrylamide) and N,N'-methylene-bis-(methacrylamide), diallyl ether, diallyl sulfosuccinate and polyallyloxyethane.

The polymer (b) of ethylene glycol, which is the second constituent of the protective colloid, is water-soluble and possesses a molecular weight of between 1,000 and 50,000, preferably, between 3,000 and 35,000. The polymer (b) may comprise homopolymers of ethylene glycol and mixtures of at least two homopolymers of different molecular weight. These polymers are products which are well-known and commercially available.

In the polymerization process of the present invention, the protective colloid comprises 15 to 70% by weight of the amide polymer (a) and 30 to 85% by weight of the polymer (b) of ethylene glycol. The colloid is used in an amount of 0.1 to 5%, preferably, 0.5 to 3%, by weight of the monomer(s) to be polymerized.

The two constituents of the protective colloid are used in the form of aqueous solutions.

The solution of the amide polymer (a) may be used at any time after its preparation, but, according to a preferred form of the invention, is used immediately after its preparation.

The solution of amide polymer (a) and the solution of polymer (b) of ethylene glycol may be introduced separately into the medium for polymerization in emulsion, or, the polymer of ethylene glycol may be dissolved in the solution of amide polymer (a), or, in a preferred form of the invention, the polymer of ethylene glycol (b) is added to the solution of amide(s) before polymerization of the amide polymer (a) occurs. The solutions are introduced either all at once before polymerization, or in successive portions or continuously during polymerization.

In the aqueous solution or solutions, of the two constituents of the protective colloid, the amide polymer (a) plus the polymer (b) of ethylene glycol represent from 0.1 to 15% by weight of the water.

The monomers which can be polymerized by the new process are vinyl acetate by itself, or vinyl acetate and at least one other copolymerizable monomer, such as the vinyl esters of branched or unbranched, saturated monocarboxylic acids having from 1 to 12 carbon atoms, such as vinyl propionate, "Versatate" (registered trademark for mixtures of vinyl esters of branched $C_9$ $C_{11}$ acids), vinyl pivalate and vinyl laurate, and/or the alkyl esters of unsaturated monocarboxylic or dicarboxylic acids possessing 3 to 6 carbon atoms, in which the alkyl moiety possesses 1 to 10 carbon atoms, such as methyl, ethyl, butyl and ethylhexyl acrylates, methacrylates, maleates and fumarates.

The comonomers are used in amounts such that the glass transition temperature of the polymer obtained is between −20° and 50° C., preferably, between −10° and 35° C.

Depending on the process, the monomer(s) is introduced into the polymerization medium either in total before polymerization or in successive portions or continuously during polymerization, or in part before polymerization, the other part being introduced in successive portions or continuously during polymerization.

Depending on the polymer to be obtained, it is possible to add a crosslinking monomer and/or a transfer agent to the monomer or mixture of monomers.

The crosslinking monomer, which may be used in proportions between 0 and 10%, preferably, between 0 and 3%, by weight, relative to the monomer(s), is represented more particularly by vinyl acrylate and methacrylate, divinyl ether, mono- or poly-(alkylene ($C_2$-$C_4$) glycol) acrylates and methacrylates, allyl phthalate, triallyl cyanurate, tetraallyloxythane, alkali metal diallylsulfosuccinates, and condensates of unsaturated carboxylic acids ($C_3$-$C_5$) with polyols, such as, for example, trimethylolpropane acrylate and methacrylate.

The transfer agent, which may be used in proportions of between 0 and 10%, preferably, between 0 and 3%, by weight, relative to the monomer(s), is represented by halogenohydrocarbons, such as methylene chloride, chloroform, carbon tetrachloride, bromoform, carbon tetrabromide, dichloroethane and trichloroethane; aliphatic alcohols having 1 to 4 carbon atoms, such as methanol and allyl alcohol; and, preferably, mercaptans, such as laurylmercaptan, dodecylmercaptan and aminophenylmercaptan.

The crosslinking monomer and/or the transfer agent are introduced by themselves or in a mixture, in any known manner, before or during polymerization, for example at the same time as the monomer(s), either simultaneously or, more particularly, in solution in the monomer or the mixture of monomers.

The concentration of monomer(s) in the polymerization medium is advantageously between 10 and 70% by weight.

A suitable initiator is selected from conventional water-soluble initiators for polymerization in emulsion, such as hydrogen peroxide, alkali metal persulfates, water-soluble diazo derivatives, or redox systems based on oxidizing agents, such as hydrogen peroxide, organic peroxides or hydroperoxides, and reducing agents, such as alkali metal sulfites and bisulfites, amines, hydrazine and metal formaldehydesulfoxylates. The initiator is used in proportions of the order of 0.05 to 4.5%, preferably, 0.1 to 2%, by weight of the monomer(s). It is introduced into the polymerization medium in total before polymerization or in successive portions or continuously during polymerization, or, in part before polymerization, the other part being added in successive portions or continuously during polymerization, especially if the life of the initiator at the polymerization temperature is short.

To ensure the stability of the reaction medium and of the latex to be obtained, one or more emulsifiers may be present in the reaction medium. The emulsifiers may be anionic and/or non-ionic and are conventional products for polymerization in emulsion.

Representative anionic emulsifiers include salts of fatty acids; alkali metal alkylsulfates, alkylsulfonates, alkylarylsulfonates, alkylsulfosuccinates and alkylphosphates; sulfonates of alkylphenol polyglycol ethers; salts of alkylsulfopolycarboxylic acid esters; condensation products of fatty acids with oxyalkanesulfonic and aminoalkanesulfonic acids; sulfated derivatives of polyglycol ethers; sulfated fatty acid esters of polyglycols; and sulfated fatty acid alkanolamides.

Representative non-ionic emulsifiers include fatty acid esters of polyalcohols, fatty acid alkanolamides, ethylene oxide/propylene oxide copolymers, oxyethyleneated alcohols and alkylphenols, and sulfated oxyethyleneated alcohols and alkylphenols.

The amounts of emulsifier(s) to be used are of the order of 0.1 to 3% by weight, relative to the monomer(s), and their introduction into the reaction medium may be carried out either in total before polymerization, or in part before polymerization, the complementary part being added to the reaction medium in successive portions or continuously during polymerization, or in total in successive fractions or continuously during polymerization, depending on the average particle diameter of the latex to be obtained. According to a particular embodiment of the invention, the emulsifier is added to the medium for the preparation of the amide polymer (a), this being the first constituent of the protective colloid.

Depending on the nature of the monomer or monomers used, and to prevent hydrolysis of the polymer, it may be advantageous to keep the polymerization medium at a pH between 3 and 7. This may be achieved by adding a pH regulator to the medium. Representative pH regulators include a base, such as sodium hydroxide or ammonia, and/or a buffer, such as sodium acetate, sodium bicarbonate or borax. The regulator is added to the medium, by itself or in a mixture, in total or in part before polymerization, the complementary part being added in successive portions or continuously during polymerization, or in total in successive portions or continuously during polymerization, and, more particularly, is added to the medium for the preparation of the amide polymer (a), this being the first constituent of the protective colloid.

The polymerization temperature, which is a function of the initiator used and the polymer to be obtained, is generally between 0° and 95° C., preferably, between 20° and 90° C.

According to a variant, the process described above is carried out in the presence of a seed polymer, to ensure better control over the particle size of the latex to be obtained. This seed polymer may be identical to or different from the polymer to be obtained. The seed polymer is obtained by the polymerization, in aqueous emulsion, of vinyl acetate and/or of at least one of the comonomers listed above. The latex of seed polymer obtained is added to the polymerization medium at the same time as one of the constituents of the protective colloid, or at the same time as the mixture of these two constituents, or is prepared in the presence of one or both of the constituents of the protective colloid.

Depending on the intended application of the latex, it is possible to add a plasticizer, before, during or after polymerization, in proportions between 0 and 20%, preferably, between 0 and 10%, by weight, relative to the polymer. This plasticizer, which is used by itself or in a mixture, is chosen from amongst the conventional plasticizers and coalescence agents for polyvinyl acetate, such as halogenated or unhalogenated alkyl ($C_4$-$C_6$) phthalates, like dibutyl, diethyl, and trichloroethyl phthalates, ethylene glycol phthalate, adipate and dibenzoate, butylcarbitol acetate, butyl glycolate, glycerol triacetin, dipropyl or diisobutyl succinates, glutarates and adipates, and tricresyl and triphenyl phosphates.

The polymer latices obtained possess a concentration of 10 to 70%, preferably, 35 to 65%, by weight of particles of polymers having a glass transition temperature between −20° and 50° C. The size distribution of the particles, which may be narrow or broad, is between 0.05 and 1 μm. The latices have an extensive viscosity ranging from a few mPa.s, such as 50 mPa.s, to 80,000 mPa.s, preferably, 50 to 30,000 mPa.s, and give films having a very good resistance to water.

The latices are used as binders in the manufacture of paints, glues, paper, textiles, in particular, non-woven textiles, floor coverings and mortar additives.

Examples of embodiments of the invention are given below by way of illustration rather than by way of limitation. In these examples, the percentages are by weight; the viscosity of the latex is measured at 20° C. using a Brookfield RVT viscometer at a speed of 50 rpm; the particle diameter is measured by electron microscopy; the glass transition temperature of the polymer (Tg) is measured by differential calorimetric analysis; the water resistance is determined by placing a drop of demineralized water on a 300 μm film of polymer obtained by depositing the latex on a transparent glass plate, this being followed by drying for 2 hours at 50° C. and then for 24 hours at ambient temperature. The water resistance is expressed as the time required for the film to become opaque at the location of the drop of water.

EXAMPLE 1

Preparation of the Protective Colloid

The following are introduced into a reactor fitted with a condenser, a nitrogen inlet and a stirrer:

1,500 g of deionized water;
13.5 g of acrylamide;
5.5 g of sodium acetate;
68.5 g of a 26% strength aqueous solution of sodium tetradecylsulfonate;
18 g of polyethylene glycol of molecular weight 10,000.

The air is removed by the passage of a stream of nitrogen. The stream of nitrogen is maintained and the mixture is stirred. After dissolution, the solution is heated to 60° C.

As soon as the solution has reached 60° C., a solution of 0.71 g of ammonium persulfate in 50 cm$^3$ of water is introduced, and the solution is kept at 60° C. for 1 hour. The stream of nitrogen is then stopped.

Polymerization

A solution of 2 g of ammonium persulfate in 50 cm$^3$ of water is added to the colloid solution obtained. 1,800 g of vinyl acetate are then introduced continuously at a constant rate over 3 hours.

15 minutes after the start of the introduction of vinyl acetate, the reaction mixture is heated to 80° C. and then kept at this temperature, and 2 g of ammonium persulfate in 200 g of water are introduced continuously at a constant rate over 2 hours and 45 minutes.

Two hours after the introduction of ammonium persulfate and vinyl acetate have ended, the reaction mixture is cooled. A polyvinyl acetate latex is obtained, having the following characteristics:

pH: 4.2
viscosity: 300 mPa.s
concentration: 50.1%
particle diameter: 0.2–0.5 μm
Tg of the polymer: 34° C.
water resistance: 10 minutes In contrast, for a polyvinyl acetate prepared by polymerization in emulsion in the presence of an amount of polyvinyl alcohol equal to that of the protective colloid of Example 1, a film prepared therefrom becomes opaque immediately.

By way of comparison, Example 1 is repeated, with the 13.5 g of acrylamide being replaced by 6.5 g of acrylamide, 6 g of methacrylamide and 1 g of acrylic acid. As soon as the polymerization of the vinyl acetate has started, coarse particles are formed in the reaction medium, which is completely coagulated by the time the introductions have ended. The product obtained is unusable.

If, in this comparison experiment, the polyethylene glycol is added to the medium before polymerization of the vinyl acetate, instead of being added to the colloid preparation, crusts form on the walls of the polymerization reactor and on the stirrer. The latex obtained contains coarse particles and has an undesirably low viscosity. In applications, such as latex gives properties which are inferior to those obtained with the latex of Example 1.

EXAMPLE 2

The procedure of Example 1 is followed, but the following constituents are used:

For the Preparation of the Protective Colloid 1,450 g of deionized water;
13.5 g of acrylamide;
5.5 g of sodium acetate,
71 g of a 25% strength aqueous solution of sodium tetradecylsulfonate;
18 g of polyethylene glycol of molecular weight 10,000.

For the Polymerization

A mixture of 1,350 g of vinyl acetate and 450 g of "Versatate VEOVA 10" (registered trademark) in place of the 1,800 g of vinyl acetate.

"Versatate VEOVA 10" is a mixture of vinyl esters of branched $C_9$ to $C_{11}$ monocarboxylic acids. A latex of a 75/25 vinyl acetate/"Versatate" copolymer is obtained, having the following characteristics:

pH: 4.3
viscosity: 760 mPa.s
concentration: 51.2%
particle diameter: 0.15–0.45 μm
Tg of the copolymer: 24° C.
water resistance: 12 minutes A 75/25 vinyl acetate/"Versatate" copolymer prepared in the presence of an amount of polyvinylpyrrolidone equal to that of the protective colloid of Example 2 has a water resistance of 30 seconds.

EXAMPLE 3

Example 2 is repeated using 12.5 g of acrylamide and 1 g of N,N'-methylene-bis-(acrylamide) in place of the 13.5 g of acrylamide, and also using 61 g of a 29% strength aqueous solution of sodium tetradecylsulfonate. A latex of a 75/25 vinyl acetate/"Versatate" copolymer is obtained, having the following characteristics:

pH: 4.5 viscosity: 370 mPa.s
concentration: 50.7%
particle diameter: 0.3–0.6 μm
Tg of the copolymer: 24° C.

EXAMPLE 4

Preparation of Constituent (a) of the Protective Colloid

The following are introduced into a reactor fitted with a condenser, a nitrogen inlet and a stirrer:
1,700 g of deionized water;
15.5 g of acrylamide.

The air is removed by passage of a stream of nitrogen. The stream of nitrogen is maintained and the mixture is stirred. After dissolution, the solution is heated to 60° C.

As soon as the solution has reached 60° C., a solution of 0.8 g of ammonium persulfate in 50 cm$^3$ of water is introduced and the solution is kept at 60° C. for 1 hour. The stream of nitrogen is then stopped.

Polymerization

The following are added successively to the solution obtained:
18 g of polyethylene glycol of molecular weight 10,000;
5.5 g of sodium acetate;
90 g of a 20% strength aqueous solution of sodium tetradecylsulfonate;
a solution of 2 g of ammonium persulfate in 50 cm$^3$ of water.

A mixture of the following is then introduced at a constant rate over 3 hours:
1,350 g of vinyl acetate and
450 g of "Versatate VEOVA 10".

15 minutes after the start of the introduction of the monomer mixture, the reaction mixture is heated to and maintained at 80° C., and 2 g of ammonium persulfate in 200 g of water are introduced continuously at a constant rate over 2 hours 45 minutes.

Two hours after the monomer mixture and ammonium persulfate in water have been completely added, the reaction mixture is cooled.

A latex of a 75/25 vinyl acetate/"Versatate VEOVA 10" copolymer is obtained, which has the following characteristics:
pH: 4.3
viscosity: 392 mPa.s
concentration: 51%
particle diameter: 0.15–0.45 μm
Tg of the copolymer: 24° C.

EXAMPLE 5

Preparation of the Protective Colloid

The following are introduced into a reactor fitted with a condenser, a nitrogen inlet and a stirrer:
5,890 g of deionized water;
107 g of acrylamide;
43 g of sodium acetate;
488 g of a 29.5% strength solution of sodium tetradecylsulfonate;
144 g of polyethylene glycol of molecular weight 10,000. The air is removed by passage of a stream of nitrogen, which stream is maintained during the preparation of the colloid. The mixture is stirred. After dissolution, the solution is heated to and maintained at 60° C.

As soon as the solution has reached 60° C., 6 g of ammonium persulfate in 20 cm$^3$ of water are introduced.

After a reaction time of 1 hour, the nitrogen stream is stopped.

Preparation of a Seed 3.5 g of ammonium persulfate and 144 g of vinyl acetate are added to the colloid solution.

After 20 minutes, the reaction medium is heated to 80° C., kept at this temperature for 1 hour and then cooled to ambient temperature.

Polymerization

The following are introduced successively into a reactor:
800 g of the seed obtained above;
800 g of deionized water.

The mixture is stirred and heated to and maintained at 80° C. As soon as the mixture has reached 80° C., a solution of 2 g of ammonium persulfate in 10 cm$^3$ of water is added thereto.

A mixture containing:
1,332 g of vinyl acetate and
450 g of "Versatate VEOVA 10",
and a solution containing:
100 g of deionized water and
2 g of ammonium persulfate,
and then introduced simultaneously at a constant rate over 3 hours.

2 hours after the introduction of monomer mixture and ammonium persulfate solution has ended, the reaction mixture is cooled.

A latex of a 75/25 vinyl acetate/"Versatate" copolymer is obtained, having the following characteristics:
pH: 3.5
viscosity: 900 mPa.s
concentration: 50.8%
particle diameter: 0.35–0.65 μm
Tg of the copolymer: 24° C.

EXAMPLE 6

Preparation of the Protective Colloid

The following are introduced into a reactor fitted with a condenser, a nitrogen inlet and a stirrer:
1,500 g of deionized water;
14 g of acrylamide;
5.5 g of sodium acetate;
68.5 g of a 25% strength aqueous solution of sodium tetradecylsulfonate;
9 g of polyethylene glycol having molecular weight of 10,000;
9 g of polyethylene glycol having molecular weight of 6,000.

The air is removed by the passage of a stream of nitrogen. The stream is maintained and the mixture is stirred. After dissolution, the solution is heated to 60° C.

As soon as the solution has reached 60° C., a solution of 0.7 g of ammonium persulfate in 50 cm$^3$ of water is introduced, and the solution is kept at 60° C. for 1 hour. The stream of nitrogen is then stopped.

Polymerization

A solution of 2 g of ammonium persulfate in 50 cm$^3$ of water is added to the solution of protective colloid obtained. A mixture of 1,530 g of vinyl acetate and 270 g of butyl acrylate is then introduced continuously at a constant rate over 3 hours.

15 minutes after the start of the introduction of vinyl acetate and butyl acrylate, the reaction mixture is heated to and maintained at 80° C., and 2 g of ammonium persulfate in 200 cm³ of water are introduced continuously at a constant rate over 2 hours 45 minutes.

Two hours after the introductions have ended, the reaction mixture is cooled.

A latex of an 85/15 vinyl acetate/butyl acrylate copolymer is obtained, having the following characteristics:

pH: 4.2
viscosity: 370 mPa.s
concentration: 50.3%
particle diameter: 0.2–0.5. μm
Tg of the polymer: 22° C.
water resistance: 15 minutes By comparison, an 85/15 vinyl acetate/butyl acrylate copolymer prepared in the presence of an amount of hydroxyethylcellulose equal to that of the protective colloid of Example 6 possesses a water resistance of only 1 minute.

What is claimed is:

1. A process for the preparation of a latex of a vinyl acetate polymer, comprising the step of polymerizing vinyl acetate or vinyl acetate and a monomer copolymerizable with vinyl acetate, in aqueous emulsion, in the presence of an initiator, an emulsifier and a protective colloid, said protective colloid comprising a water-soluble polymer (a) containing at least one monomer selected from the group consisting of acrylamide, methacrylamide, substituted or unsubstituted N-alkyl derivatives of acrylamide and substituted or unsubstituted N-alkyl derivatives of methacrylamide, and a water-soluble polymer (b) of ethylene glycol, said polymer (b) having molecular weight between 1,000 and 50,000.

2. The process of claim 1, wherein said water-soluble polymer (a) is selected from the group consisting of (a) at least one homopolymer containing a monomer selected from the group consisting of acrylamide, methacrylamide, N-alkyl ($C_1$–$C_4$) derivatives of acrylamide which are unsubstituted or substituted by amine, hydroxyl or alkoxy ($C_1$–$C_4$) groups and N-alkyl ($C_1$–$C_4$) derivatives of methylacrylamide which are unsubstituted or substituted by amine, hydroxyl or alkoxy ($C_1$–$C_4$) groups, (b) at least one copolymer containing at least two monomers selected from the group consisting of acrylamide, methacrylamide, N-alkyl ($C_1$–$C_4$) derivatives of acrylamide which are unsubstituted or substituted by amine, hydroxyl or alkoxy ($C_1$–$C_4$) groups and N-alkyl ($C_1$–$C_4$) derivatives of methacrylamide which are unsubstituted or substituted by amine, hydroxyl or alkoxy ($C_1$–$C_4$) groups and (c) mixtures thereof.

3. The process of claim 2, wherein said water-soluble polymer (a) is obtained by the polymerization of at least one of said amide monomers at a concentration of 0.1 to 7% by weight, in aqueous solution, at a temperature of 0° to 90° C. in the presence of an initiator selected from the group consisting of a water-soluble free-radical initiator, ultraviolet rays and a combination thereof.

4. The process of any one of claims 1 to 3, wherein said water-soluble polymer (a) is crosslinked by a water-soluble crosslinking agent.

5. The process of claim 1, wherein the polymer (b) of ethylene glycol is a homopolymer of ethylene glycol or a mixture of homopolymers of ethylene glycol.

6. The process of claim 1, wherein, in the protective colloid, said water-soluble polymer (a) represents 15 to 70% by weight protective colloid and said polymer (b) of ethylene glycol represents 30 to 85% by weight protective colloid.

7. The process of claim 1, wherein the protective colloid is used in an amount of 0.1 to 5% by weight of said vinyl acetate or said vinyl acetate and said monomer copolymerizable with said vinyl acetate.

8. The process of claim 1, wherein said copolymerizable monomer is selected from the group consisting of vinyl esters of branched or unbranched, saturated monocarboxylic acids ($C_1$–$C_{12}$), alkyl ($C_1$–$C_{10}$) esters of unsaturated monocarboxylic or dicarboxylic acids ($C_3$–$C_6$) and wherein said copolymerizable monomer is used in an amount such that the copolymer obtained has a glass transition temperature between −20° and 50° C.

9. The process of claim 1 wherein said vinyl acetate or said vinyl acetate and said copolymerizable monomer are polymerized in the presence of 0.1 to 3% by weight, relative to said vinyl acetate or said vinyl acetate and copolymerizable monomer, of an emulsifier selected from the group consisting of anionic, non-ionic and a combination thereof.

10. The process of claim 1 wherein a seed polymer is present in the polymerization medium, said seed polymer being identical to or different from said polymer to be obtained.

11. A latex of a vinyl acetate polymer, obtained in accordance with the process of claim 1, said latex containing particles of said polymer in a concentration of 10 to 70% by weight, said polymer having a glass transition temperature between −20° and 50° C., said particles having a size distribution between 0.05 and 1 μm, and said latex having a viscosity between about 50 mPa.s and 80,000 mPa.s.

* * * * *